US006843125B2

United States Patent
Peterson et al.

(10) Patent No.: US 6,843,125 B2
(45) Date of Patent: Jan. 18, 2005

(54) FLUID-ALIGNED MEASUREMENT APPARATUS AND METHOD

(76) Inventors: Robert Peterson, 1 Highmeadow Rd., Pittsburgh, PA (US) 15215; James C. Hobson, 5250 Whispering Oak, West Bloomfield, MI (US) 48322; Mikhail V. Novikov, 101 Washington Ave., Oakmont, PA (US) 15139

( * ) Notice: Subject to any disclaimer, the term of this patent is extended or adjusted under 35 U.S.C. 154(b) by 0 days.

(21) Appl. No.: 10/042,545

(22) Filed: Jan. 8, 2002

(65) Prior Publication Data

US 2003/0163274 A1 Aug. 28, 2003

(51) Int. Cl.$^7$ .................................................. G01D 5/42
(52) U.S. Cl. ............................. 73/379; 73/375; 73/497; 73/119 R; 33/543
(58) Field of Search ......................... 73/37, 37.5, 37.9, 73/47, 49.7, 104, 119 R, 116, 118.2, 49.6, 49.8; 33/543–544.5, 611

(56) References Cited

U.S. PATENT DOCUMENTS

| | | | | |
|---|---|---|---|---|
| 1,891,365 A | * | 12/1932 | Albertson et al. | 33/611 |
| 1,996,092 A | * | 4/1935 | Albertson et al. | 33/611 |
| 2,739,389 A | * | 3/1956 | Carter | 33/543 |
| 3,782,171 A | * | 1/1974 | Watt | 73/37.9 |
| 4,030,201 A | | 6/1977 | Possati et al. | 33/504 |
| 4,034,478 A | | 7/1977 | Yager | 33/611 |
| 4,062,124 A | | 12/1977 | Albertazzi | 33/543 |
| 4,285,132 A | | 8/1981 | Kloster | 33/550 |
| 4,521,863 A | | 6/1985 | Solaroli | 702/158 |
| 4,679,330 A | | 7/1987 | Williams | 33/550 |
| 4,803,783 A | | 2/1989 | Tiegs et al. | 33/557 |
| 5,105,523 A | | 4/1992 | Howard | 29/467 |
| 5,152,166 A | * | 10/1992 | Brock et al. | 73/37.9 |
| 5,182,865 A | | 2/1993 | Greenslade | 33/550 |
| 5,259,121 A | | 11/1993 | Possati et al. | 33/542 |
| 5,533,384 A | | 7/1996 | Pierce et al. | 73/47 |
| 5,576,826 A | | 11/1996 | Hamar | 356/138 |
| 5,784,795 A | | 7/1998 | Tinarelli | 33/559 |
| 6,006,437 A | | 12/1999 | Cipriani | 33/543.1 |
| 6,011,616 A | | 1/2000 | Volcy et al. | 356/73.1 |

* cited by examiner

Primary Examiner—Hezron Williams
Assistant Examiner—David A. Rogers
(74) Attorney, Agent, or Firm—Ference & Associates

(57) ABSTRACT

An apparatus 10 for producing one or more characterizing measurements of a surface 12 in relation to a repeatedly reproducible datum axis A-A, the apparatus 10 comprising a probe 14; a first porous surface 16 located on the probe 14, the first porous surface 16 being in communication with a first source of fluid pressure 18, the first porous surface 16 being located proximate to opposing walls 20 that defines a volume 22, so that a non-contacting fluid pressure gap 24 is formed between the first porous surface 16 and the walls 20, the first porous surface 16 defining the datum axis A-A; at least one second porous surface 26 located on the probe 14, the at least one second porous surface 26 being in communication with a second source of fluid pressure 28, the at least one second porous surface 26 being located in a cooperative relationship with the surface 12 to be measured, so that a non-contacting fluid pressure gap 30 is fanned between the at least one second porous surface 26 and the surface to be measured; and means for generating one or more characterizing measurements of the surface to be measured in relation to the datum axis.

11 Claims, 8 Drawing Sheets

PROBE OFF CENTER

FINAL CENTRALIZED POSITION
ALL RADIAL FORCES BALANCED

WAVINESS ERROR

FLUID-ALIGNED MEASUREMENT APPARATUS AND METHOD

FIELD OF THE INVENTION

This invention relates to an apparatus for producing one or more characterizing measurements of a surface in relation to a repeatedly reproducible Datum axis.

BACKGROUND OF THE INVENTION

Concentricity, ovality, waviness, and out-of-plane features characterize a geometric surface. Such characterizing features are used in a number of applications; one in particular involves measuring a valve seat relative to a valve guide cavity of an engine's combustion chamber. Wherein, a valve reciprocates in the valve guide to open and close intake and exhaust passages, which communicate with engine cylinders. The valve seat is a tapered surface that facilitates seating the valve head in the intake and exhaust passages from the cylinders during the compression and power strokes of the engine.

When the valve head does not properly fit in the valve seat, the intake passage and the exhaust passage will riot be sealed properly during the compression and power strokes, thus causing power loss, reduced fuel economy, rough engine idling and increased pollution. Poor sealing also reduces the valve head and valve seat life by allowing hot exhaust gasses to leak and contact the valve surfaces and the valve seats. In order to promote seal quality, it is desirable to have the valve guide and the valve seat centers closely aligned along a common center with minimal error in ovality, waviness, and out-of-plane parameters.

The invention claimed herein improves upon known prior art, including Pierce et al. (U.S. Pat. No. 5,533,384). Pierce teaches a measuring device having contact with a surface to be used in relation to measuring concentricity. Pierce lacks the ability to repeatedly reproduce the datum axis using a non-contacting fluid pressure gap. The present invention improves upon Pierce by increasing accuracy of concentricity, ovality, waviness and out-of-plane by having a repeatedly reproducible datum axis that is generated using a non-contacting fluid pressure gap.

SUMMARY OF THE INVENTION

The present invention pertains to an apparatus for producing one or more characterizing measurements of a surface in relation to a repeatedly reproducible datum axis. The characterizing measurements include determinations of concentricity, ovality, waviness, and out-of-plane conditions.

To accomplish these functions, the invention incorporates: a probe; a first porous surface located on the probe, the first porous surface being in communication with a first source of fluid pressure, the first porous surface being located proximate to opposing walls that defines a volume, so that a non-contacting fluid pressure gap is formed between the first porous surface and the walls, the first porous surface defining a datum axis; at least one second porous surface located on the probe, the at least one second porous surface being in communication with a second source of fluid pressure, the second porous surface being located in a cooperative relationship with the surface to be measured, so that a non-contacting fluid pressure gap is formed between the second porous surface and the surface to be measured; and means for generating one or more characterizing measurements of the surface to be measured in relation to the datum axis.

Therefore, it is an object of the present invention to produce one or more characterizing measurements of a surface in relation to a repeatedly reproducible datum axis, based on a probe that utilizes a non-contacting fluid pressure gap at both the first and second porous surfaces. Additional objects of the present invention include: obtaining characterizing measurements without having a measurement device touch the surface to be measured; having a plurality of second porous surfaces being located on a plurality of arms extending radially from the probe; having a second porous surface being located on a plug extending radially along the entire perimeter of the probe; having a drive assembly for rotating the probe about the datum axis; having a microprocessor for generating a signal in response to the characterizing measurements; having a calibration device for calibrating the probe; having a regulator to supply each porous surface with different levels of fluid pressure; having a template that permits registration of the apparatus in relation to the surface to be measured; having an air-bearing that provides a flotational means of allowing the probe to align in relation to the walls; having radial displacement transducers that extend radially from the probe with a porous surface located on the distal end thereof; having an transducer for recording displacement of the probe; having the first and second porous surfaces adjustably fitted with a surface that corresponds to the surface geometry of the surface to be measured; and means for communicating the measurements in real time.

These and other objects, features, and advantages of the present invention are readily apparent from the following detailed description of the best mode for carrying out the invention when taken in connection with the accompanying drawings.

BRIEF DESCRIPTION OF DRAWINGS

FIGS. 4a–4e are cross-sectional illustrations of an axial displacement of a probe in relation to a non-concentric valve seat.

DESCRIPTION OF THE PREFERRED EMBODIMENTS

This invention pertains to an apparatus for producing one or more characterizing measurements of a surface in relation to a repeatedly reproducible datum axis. The following exemplary modes for carrying out the invention relate to producing characterizing measurements of concentricity, ovality, waviness, and out-of-plane of a combustion chamber's valve seat in relation to a valve guide cavity. However, as one ordinarily skilled in the art will realize, the present invention may be used in additional automotive and non-automotive applications where similar measurements are useful.

Figure 1:
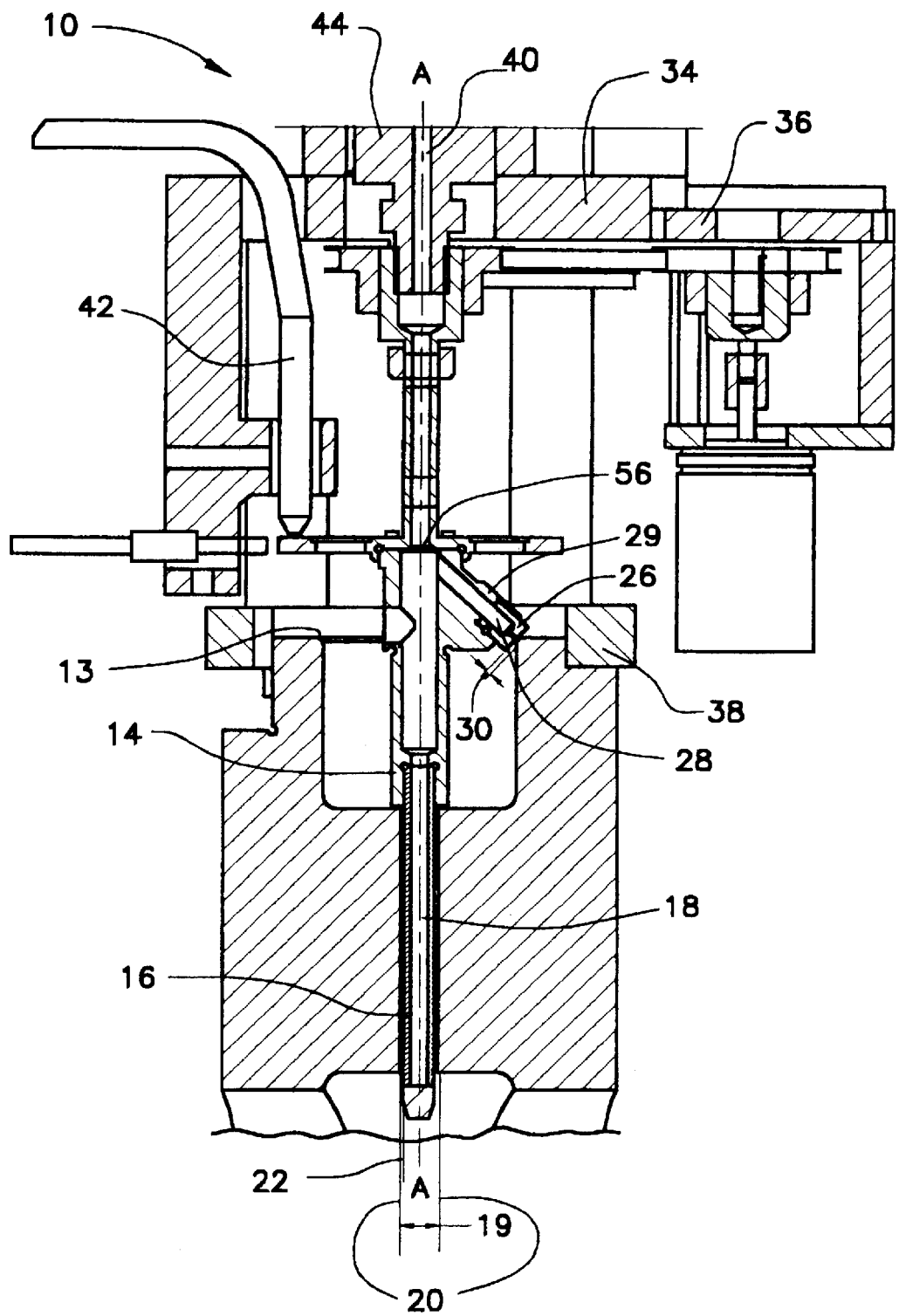
FIG. 1 is a sectional view of the invention having a second porous surface located on an arm extending radially from the probe.

FIG. 1 illustrates the preferred embodiment of an apparatus 10 for performing characterizing measurements of a valve seat surface 13 in relation to a repeatedly reproducible datum axis A-A. Located on the outer surface of the leading insertion end of a probe 14 is a first porous surface 16 that communicates with a source of first fluid pressure 18. The first porous surface 16 has a diameter sufficiently less than the diameter of a valve guide cavity 19, so that it is insertable between opposing walls 20 that define a volume 22 or the valve guide cavity 19.

Figure 2A:
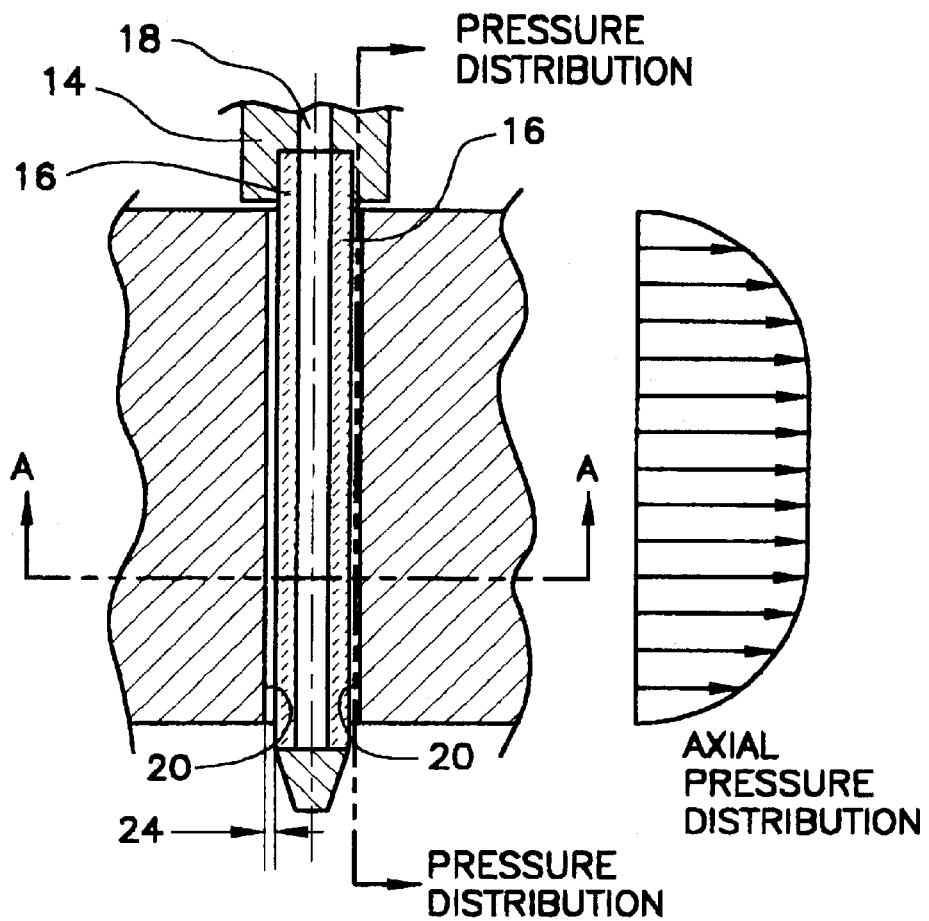
FIGS. 2a–2b are cross-sectional views of a first porous portion of a probe located within a valve stem cavity.
Figure 2B:
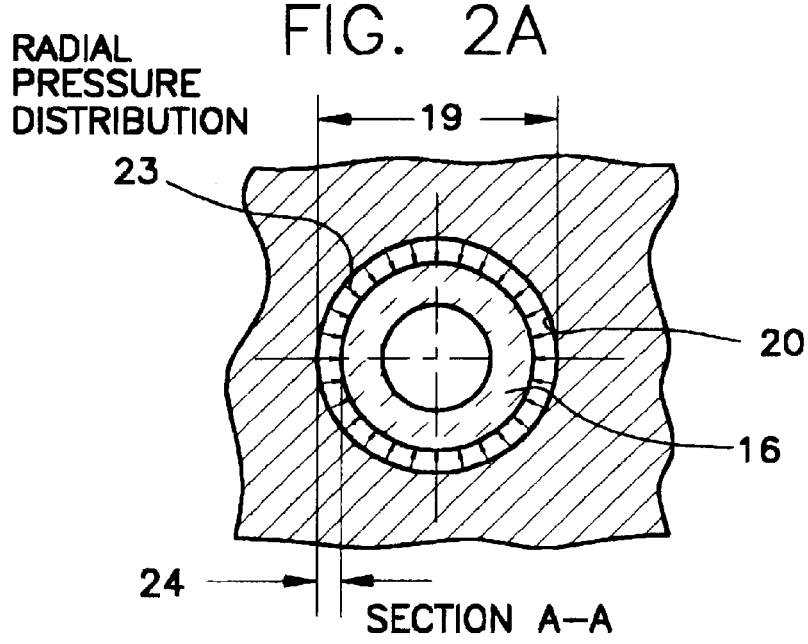

Referring to FIGS. 2a–2b, when inserted, the first fluid source 18 generates a fluid pattern 23 by projecting a fluid through the first surface 16. This action forms a non-contacting pressure gap 24 in the annulus between the first porous surface 16 and the walls 20 that align the probe 14 within the cavity 19.

Figure 3A:
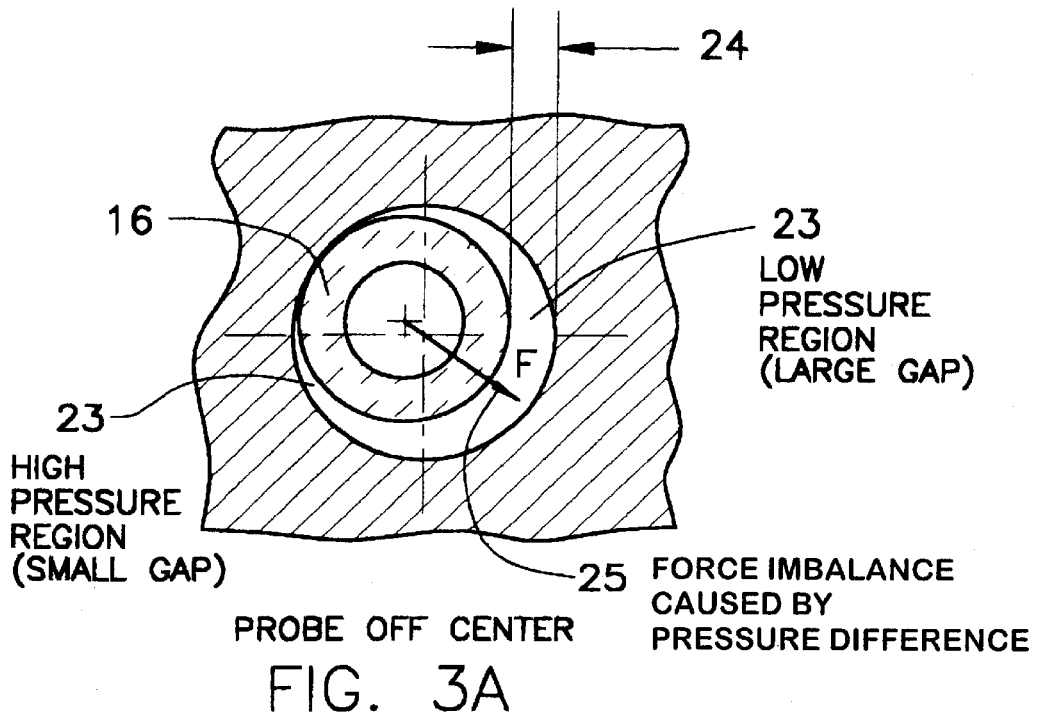
FIGS. 3a–3b are cross-sectional views of a force imbalance caused by initial location of a probe within a valve stem cavity.

For example, in FIG. 3a, an initial non-contacting fluid pressure gap causes a force imbalance 25 when the probe 14 is inserted and fluid is projected. The force imbalance 25 shifts the probe 14 until a location of equilibrium force 27 is achieved where all pressures and forces are balanced in the axial and radial directions relative to the porous surface 16 and the walls 20.

Figure 3B:
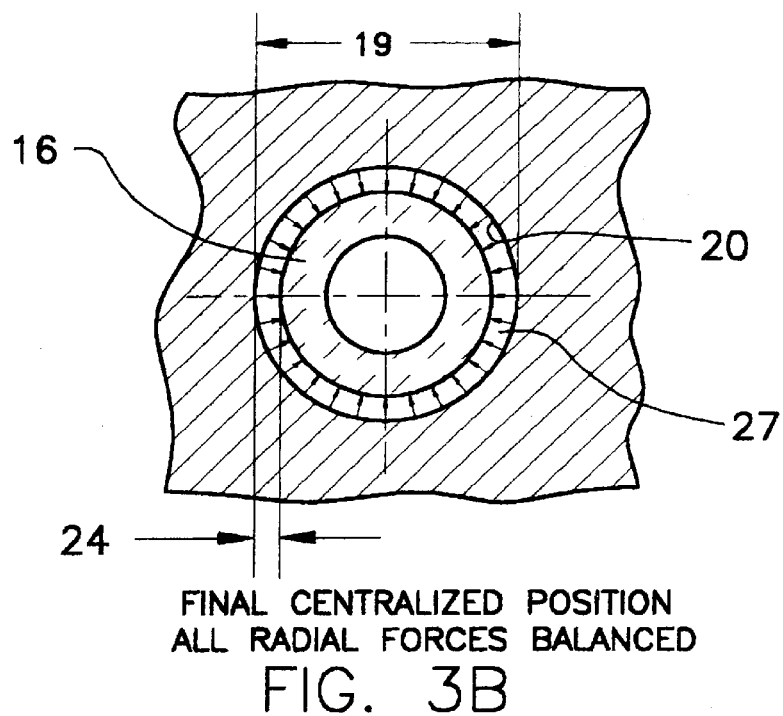

Such a location is illustrated in FIG. 3b wherein, the probe 14 is aligned in the geometric center of the cavity 19, such that the axial pressure distribution is similar to the pattern in FIG. 2a and the radial distribution is similar to the pattern in 2b. When the probe 14 is removed from the cavity 19 and re-inserted into the cavity 19, the fluid properties of the non-contacting fluid pressure gap 24 forces the probe 14 into the same equilibrium force 27 position as the previous insertion, which thereby re-aligns the reinserted probe 14 with the geometric center selected in the previous insertion. Such a characteristic produces the repeatedly reproducible datum axis that thereby defines a datum axis A-A intrinsic to the aligned center axis of the probe 14.

The first porous surface 16 is a general porous surface that allows the fluid to be projected. The term porous includes elements which may, for example, effuse, decant, shed, project, disperse, emit, radiate, and discharge fluid in a manner to facilitate producing the non-contacting fluid pressure gap 24 between the first porous surface 16 and the opposing walls 20. The structure of the first porous surface 16 generally indicates any aerated or perorated member through which the fluid may flow, and any membrane or skin surface that may be connected to or adjusted to the first porous surface 16 through which the fluid may flow. Additionally, the first porous surface 16 may be configured so as to cooperate respectively with the walls 20. For example, the first porous surface 16 may be fitted with a cylindrical configuration to match the cylindrical configuration of the valve guide cavity 19. The fluid encompasses any substance that may be used by one ordinarily skilled in the art to facilitate forming the noncontacting fluid pressure gap 24. Therefore, the fluid may be in a gaseous, liquid, or other form adaptable to accomplish this task.

Referring to FIG. 1, located on an arm 29 that extends radially from the probe 14 is a second porous surface 26 which communicates with a second source of fluid 28. The second porous surface 26 produces a non-contacting fluid pressure gap 30 proximate to the valve seat 13, wherein the non-contacting fluid pressure gap 30 is sufficient to support the weight of probe 14 and maintain the aforementioned equilibrium force 27 established by the first porous surface 16. In line with the intent of this invention, the valve seat surface is never in contact with the arm 29 during measurement of the valve seat 13, wherein the measurements are in relation to a repeatedly reproducible dictum axis A-A. As such, the calculation of the characterizing measurements maybe accomplished in a variety of methods, therefore the following method of calculation is exemplary in detail.

Specifically, the following method refers to the axial displacement of the probe 14 as a reference for producing the measurements, however, one could easily accomplish these measurements using radial displacement, as taught herein, or by other readily known concepts.

Figure 4A:
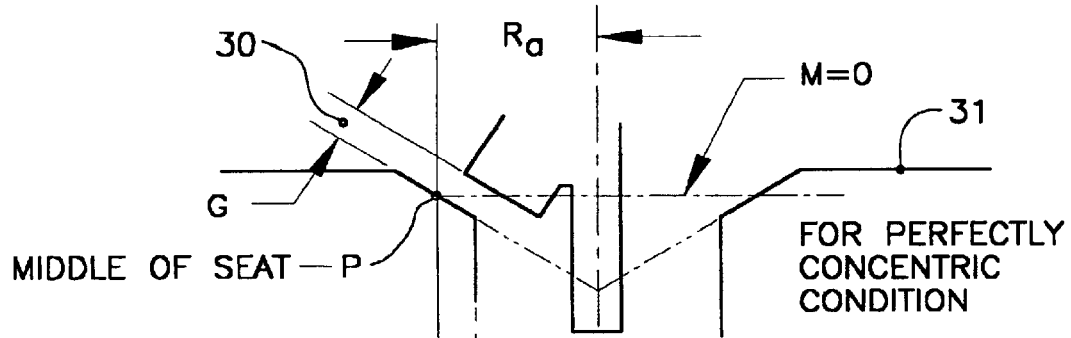
Figure 4B:
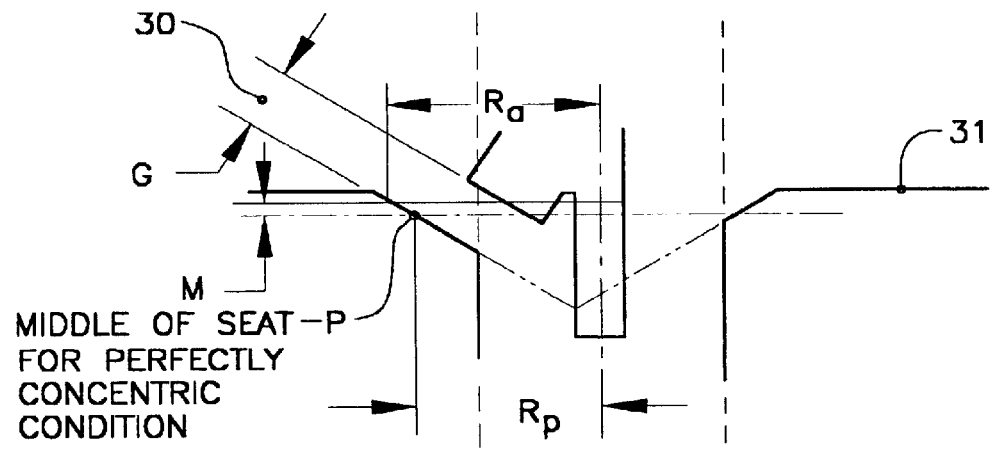
Figure 4C:
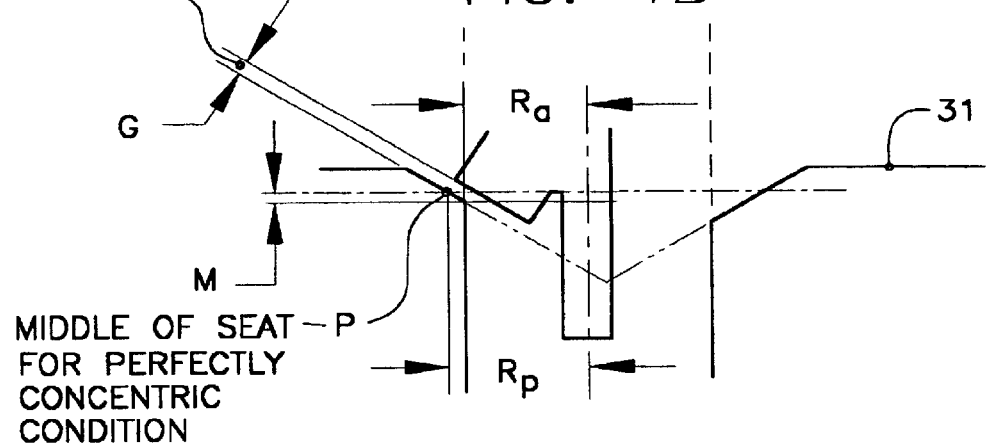

Referring to FIGS. 4a–4c, the length of the gap 30 orthogonal to the surface of the valve seat 13, defined as G, is produced in proportion to the pressure of the fluid projected against the surface 12. Drawing an orthogonal line from the datum axis A-A to a point P located in the middle surface of a perfectly concentric valve seat 13 defines a perfectly concentric valve seat radius Rp. Wherein, the arm length 29 equals the length of radius Rp minus the corresponding portion of the gap distance G.

Since the gap distance G is constant for a given pressure and the arm length A is static, when the probe 14 is rotated about the datum axis A-A the probe 14 will move axially in proportion to the difference between an actual seat radius Ra and the perfectly concentric radius Rp. Wherein, the axial displacement is recorded by an axial displacement transducer 42 as a value M. For example, FIG. 4a, being perfectly concentric, illustrates the axial position of the probe 14 when the actual radius Ra equals the perfectly concentric radius Rp. Notice, the probe arm 29 is located exactly in the middle surface of the valve seat 13, wherein the axial displacement value M would be zero or Ideal. FIG. 4b, being non-concentric, illustrates an actual radius Ra greater than the perfectly concentric radius Rp that therefore causes the probe 14 to axially displace a distance M along the valve cavity 19 away from an exterior surface 31 of the valve seat 13. FIG. 4c, being non-concentric, illustrates an actual radius Ra less than the perfectly concentric radius Rp that therefore causes the probe 14 to axially displace a distance M along the valve cavity 19 toward the exterior surface 31 of the valve seat 13.

Concentricity, ovality, waviness, and out-of-plane are calculated based upon the axial displacement value M. Referring to FIGS. 5a–5h, a means of determining the characterizing measurements using an exemplary device, such as a tracking chart (not shown) in communication with an axial transducer 42, are illustrated.

Figure 5A:
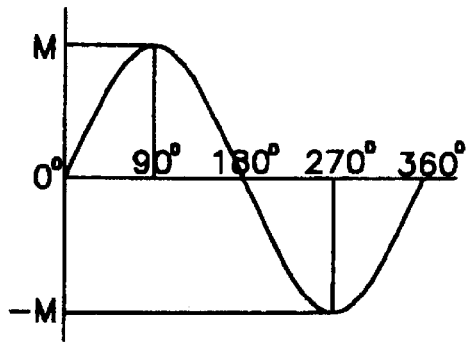
FIGS. 5a–5h are illustrations of a means for determining a multitude of characterizing measurements.
Figure 5B:
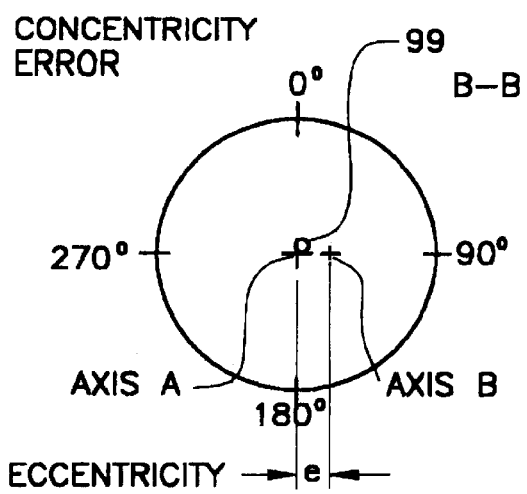

FIGS. 5a–5b depict a measurement of concentricity. Concentricity is defined as the absolute displacement of the center of the valve seat 13 relative to the center of the valve guide cavity 19.

FIG. 5a depicts a tracking chart that records the axial displacement value M as: the arm 29 is rotated about the datum axis A-A. Using the information of 4a, a microprocessor 46 calculates the actual radius Ra of die valve seat 13 based on the value M and the perfectly concentric radius Rp to produce a valve seat perimeter sketch of FIG. 5h.

From FIG. 5b, the absolute displacement of the center axis B-B to the datum axis A-A is the concentricity of the valve seat 13 relative to the center of the valve guide cavity 19.

Figure 5C:
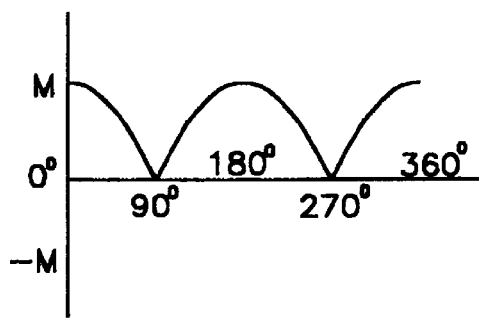
Figure 5D:
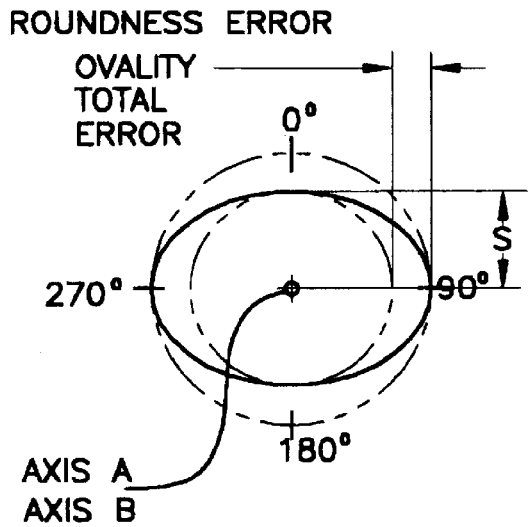

FIGS. 5c–5d depict a measure of ovality. Ovality is defined as a total error proportional to a difference between a maximum and minimum radii of a circle. FIG. 5c depicts a tracking chart that records the axial displacement value M as the arm 29 is rotated about the datum axis A-A.

Using the information of 5c, a microprocessor 46 calculates the actual radius Ra of the valve seat 13 based on the value M and the perfectly concentric radius Rp to produce a valve seat perimeter sketch of FIG. 5d. From on FIG. 5d, a minimum radius S and a maximum radius L is determined, such that ovality is the total error of the difference in diameters represented by the radii S and L.

Figure 5E:
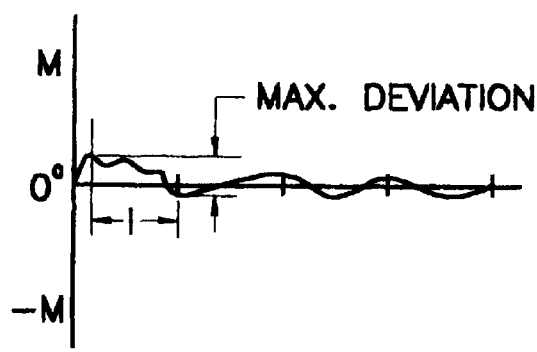
Figure 5F:
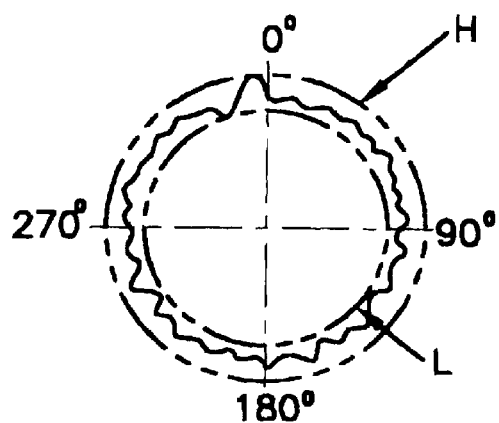

FIGS. 5e–5f depict a measurement of waviness. Waviness is defined as a total error proportional to a difference between maximum and minimum radii of a circle over an angular interval. FIG. 5e depicts a tracking chart that records the axial displacement value M as the arm 29 is rotated about the datum axis A-A. Using the information of FIG. 5e, a microprocessor 46 calculates the actual radius Ra of the valve seat 13 based on the value M and the perfectly concentric radius Rp to produce a perimeter sketch of FIG. 5f. From on FIG. 5f, for an angular interval I the minimum radius S and maximum radius L art are known, such that waviness is the total error of the difference in diameters represented by the radii S and L over the interval I.

Figure 5G:
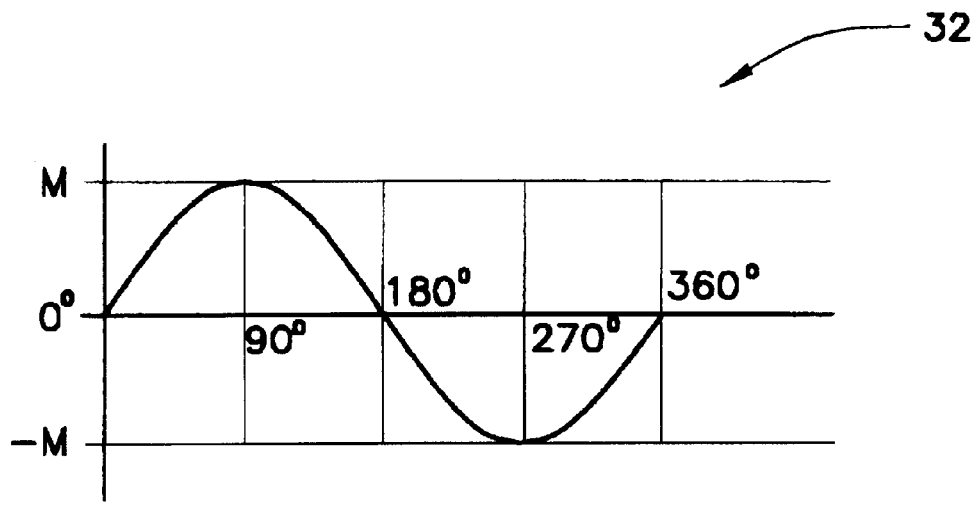
Figure 5H:
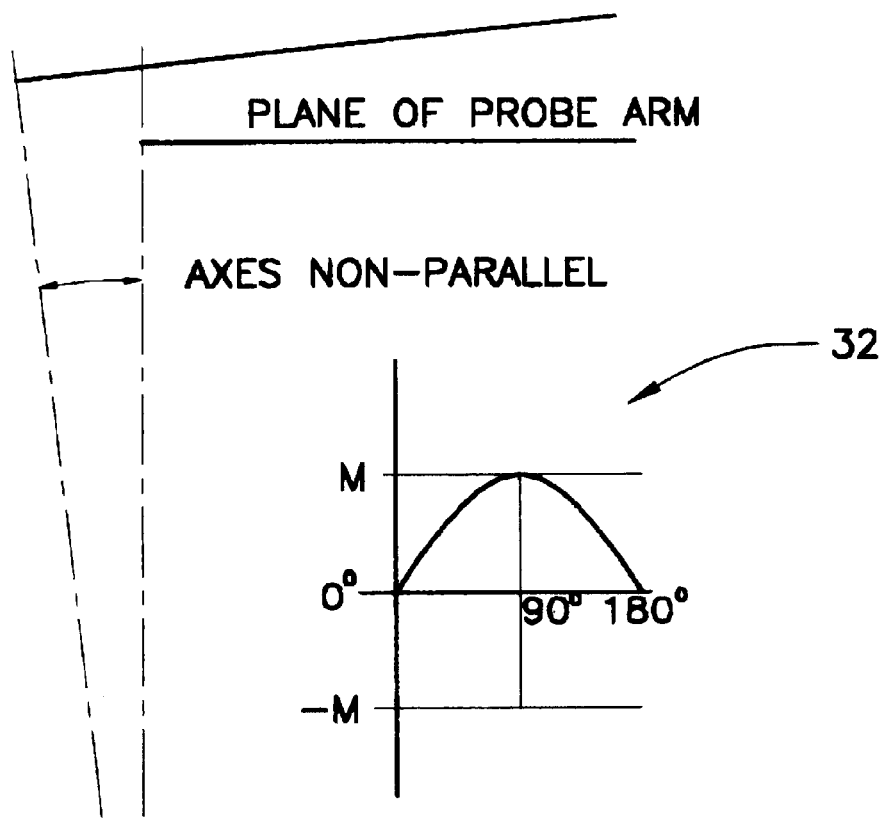

FIGS. 5g–5h depict: a measurement of out-of-plane. Out-of-plane is defined as an error due to the non-parallelism between the datum axis A-A and the center axis B-B of the valve seat 13. The arm 29 is orthogonal to the datum axis A-A, such that any non-parallelism between the valve seat 13 and the valve slide cavity 19 causes the probe 14 to axially displace during revolution. FIG. 5g depicts a tracking chart that records the axial displacement value M as the arm 29 is rotated LS about the datum axis A-A.

Using the information of FIG. 5g, a microprocessor 46 calculates a plane P of the valve seat 13 based on the value M and the perfectly concentric radius Rp to produce a plane sketch of FIG. 5h. From on FIG. 4h, in the center axis B-B is compared to the datum axis A-A, such that their non-parallelism is defined as the out-of-plane error of the valve seat 13 relative to the 20 valve guide cavity 19.

Referring to FIG. 1, as in the first porous surface 16, the second porous surface 26 is a porous surface that allows the fluid to be projected. The second porous surfaces 26 may be configured so as a, cooperate respectively with the surface of valve seat 13. For example, the second porous surface 26 may be fitted with a frustoconical configuration to match the frustoconical configuration of the valve seat 13.

The probe 14 is supported in a canister 34. The canister 34 includes: a drive assembly 36; a template 38; at least one source of fluid 40; an axial transducer 42. The drive assembly 36 rotates the probe 14 about the datum axis A-A. A template 38 permits registration of the apparatus in relation to the surface of valve seat 13 to be measured. The at least one source of fluid 40 supplies each source of fluid pressure: 18, 28 with pressure greater than atmospheric pressure. The axial transducer 42 records axial displacement of the probe 14. The support air-bearing 44 provides a flotational means for allowing the probe 14 to align within the walls 20. Additionally, the canister 34 may include a microprocessor 46, or the microprocessor 46 may be located elsewhere while in communication with the axial transducer 42, to generate a signal 48 in response to the characterizing measurements and the signal 48 may also incorporate a means 50 for communicating in real time. Furthermore, a regulator 56 may be provided to create a difference in pressures through the first and second porous surfaces 18, 28.

Figure 6A:
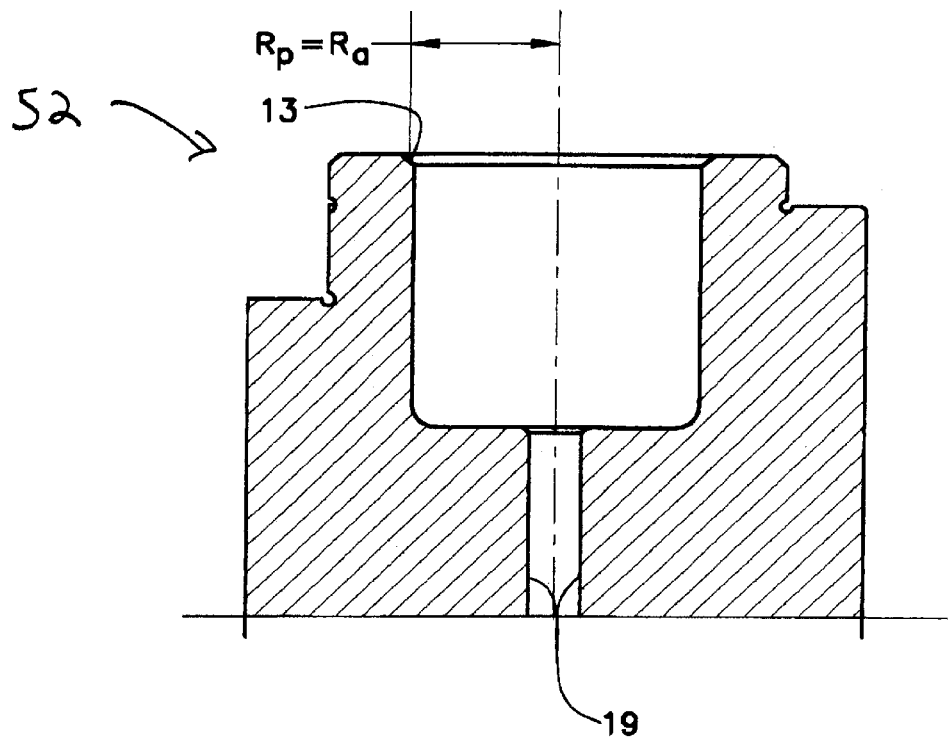
FIG. 6a is a cross-sectional view of a calibration device used to calibrate a probe.
Figure 6B:
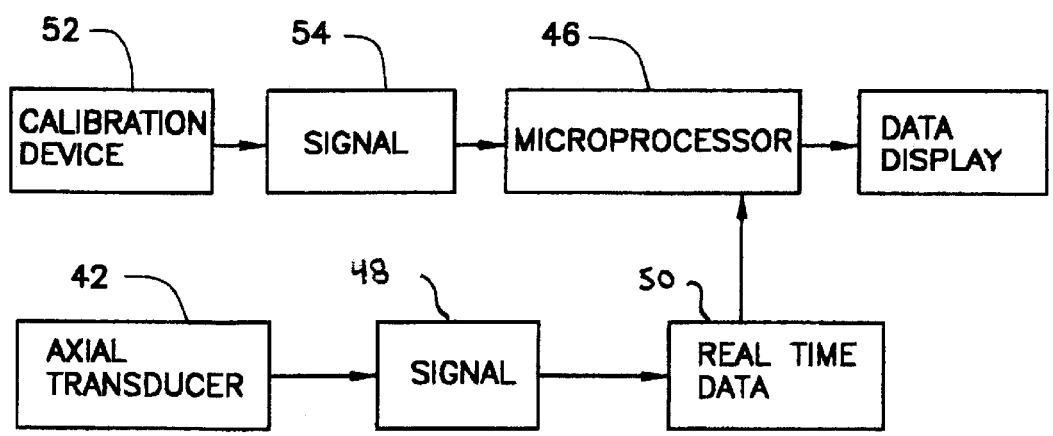
FIG. 6b is a block diagram in accordance with the present invention.

Referring to FIG. 6a, a calibration device 52 is generally indicated. The calibration device 52 is a benchmark of a particular valve guide cavity 19 and valve seat 13 relationship. The probe 14 is inserted into the device 52 by the aforementioned fluid-aligning process, whereby the probe 14 is rotated one complete revolution to generate a signal 54 representative of axial location of the probe 14, wherein the signal 54 is communicated to the microprocessor 46. Whereby, the displacement value M is set to zero or ideal for each measuring point of revolution. This information is then stored in the microprocessor 46 for comparison to the device under test. Any axial deviations between a device under test and the calibration device 52 will register as a proportion change in the displacement value M.

Another embodiment, not shown, includes having multiple arms extending radially from the probe 14 to supply additional porous surfaces or provide additional means for measuring the characteristics of the valve seat 13. For example, the additional arms may be fitted with a porous surface and a radial transducer that measure the radius of the valve seat 13 without having to monitor the axial movement of the probe.

Another embodiment, not shown, includes have a plug surface that extends radially from the probe in all directions, wherein the plug surface is at least partially supportive of a second porous surface, and may also include the aforementioned arrangement for producing radial displacement measurements.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for producing one or more characterizing measurements of a surface in relation to a repeatedly reproducible datum axis, the apparatus comprising:
   a probe
   a first porous surface located on the probe, the first porous surface being in communication with a first source of fluid pressure, the: first porous surface being located proximate: to opposing walls that defines a volume, so that a non-contacting fluid pressure gap is formed between the first porous surface and the walls, the first porous surface defining the datum axis;
   at least one second porous surface located on the probe, the at least one second porous surface being in communication with a second source of fluid pressure, with at least one second porous surface being located in a cooperative relationship with the surface to be measured, so that a non-contacting fluid pressure gap is formed between the at least one second porous surface and the surface to be measured; and means for generating one or more characterizing measurements of the surface to be measured in relation to the datum axis.

2. The apparatus of claim 1, further comprising: a canister having: a drive assembly for rotating the probe about the datum axis; a template that permits registration of the apparatus in relation to the surface to be measured; at least one source of fluid for supplying each source of fluid pressure; an axial transducer for recording axial displacement of the probe; and an air-bearing that provides a Rotational means for allowing the probe to align in relation to the walls.

3. The apparatus of claim 1, further comprising a microprocessor in communication with the axial transducer to generate a signal in response to the characterizing measurement.

4. The apparatus of claim 3, further comprising means for communicating the characterizing measurements to the microprocessor.

5. The apparatus of claim 1, further comprising a calibration device for generating a signal representative of axial location of the probe and communicating the signal to the microprocessor.

6. The apparatus of claim 1, wherein the first and second porous surfaces are configured so as to cooperate respectively with the walls and the surface to be measured.

7. The apparatus of claim 2, further including a regulator for supplying each surface with different fluid pressures.

8. An apparatus for producing one or more characterizing measurements of a surface in relation to a repeatedly reproducible datum axis, apparatus comprising:

a probe;

a first porous surface located on the probe, the first porous surface being in communication with a first source of fluid pressure, the first porous surface being located proximate opposing walls that defines a volume, so that a non-contacting fluid pressure gap is formed between the first porous surface and the walls, the first porous surface defining the datum axis;

a plug extending radially along the entire perimeter of the probe;

at least one second porous surface located on the plug, the at least one second porous surface being in communication with a second source of fluid pressure, the at least one second porous surface being located in a cooperative relationship with the surface to be measured, so that a non-contacting fluid pressure gap is formed between the at least one second porous surface and the surface to be measured; and means fur generating one or more characterizing measurements of the surface to be measured in relation to the datum axis.

9. An apparatus for producing one or more characterizing measurements of a surface in relation to a repeatedly reproducible datum axis, the apparatus comprising:

a probe;

a first porous surface located on the probe, the first porous surface being: in communication with a first source of fluid pressure the first porous surface being located proximate opposing walls that defines a volume, so that a non-contacting fluid pressure gap is formed between the first porous surface and the walls, the first porous surface defining the datum axis;

a plurality of arms extending radially from the probe;

a plurality of second porous surfaces located on the plurality of arms, the plurality of second porous surfaces being in communication with a second source of fluid pressure, the plurality of second porous surfaces being located in a cooperative relationship with the surface to be measured, so that a non-contacting fluid pressure gap is formed between the plurality of second porous surfaces and the surface to be measured; and means for generating one or more characterizing measurements of the surface to be measured in relation to the datum axis.

10. A method for producing one or more characterizing measurements of a surface in relation to a repeatedly reproducible datum axis, the method comprising:

providing a probe;

providing a first porous surface located on the probe, the first porous surface being in communication with a first source of fluid pressure, the first porous surface being located proximate to opposing walls that defines a volume, so that a non-contacting fluid pressure gap is formed between the first porous surface and the walls, the first porous surface defining the datum axis; providing at least one second porous surface located on the probe, the at least one second porous surface being in communication with a second source of fluid pressure, the at least one second porous surface being located in a cooperative relationship with the surface: to be measured, so that a non-contacting fluid pressure gap is formed between the at least one second porous surface and the surface to be measured; and generating one or more characterizing measurements of the surface to be measured in relation to the datum axis.

11. A method for producing one or more characterizing measurements of a surface to be measured in relation to a repeatedly reproducible datum axis, the method comprising, placing a probe between opposing walls so that a non-contacting fluid gap is created there between to define an equilibrium position that defines a datum axis of the probe within a volume;

rotating the probe about the datum axis; recording axial movement of the probe during rotation as a non-contacting fluid pressure gap is maintained between a surface: to be measured and at least one arm extending radially from the probe; and generating one or more characterizing measurements of the surface to be measured based on the axial movement of the probe.

* * * * *